Figure 5:
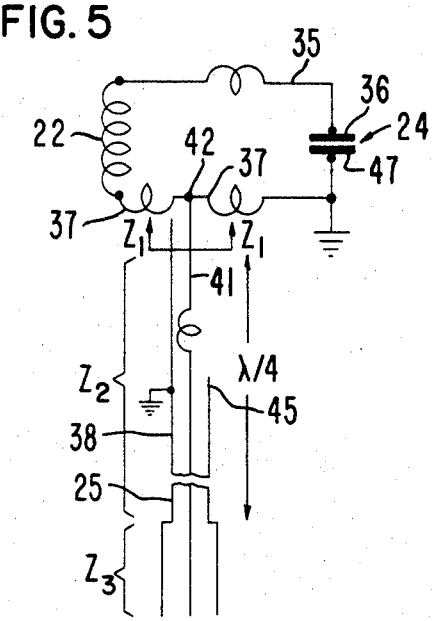

Sept. 17, 1968 G. A. BAKER 3,402,346
COAXIAL RECEIVER COIL AND CAPACITOR STRUCTURE FOR
PROBES OF UHF GYROMAGNETIC SPECTROMETERS
Filed April 22, 1966 3 Sheets-Sheet 1
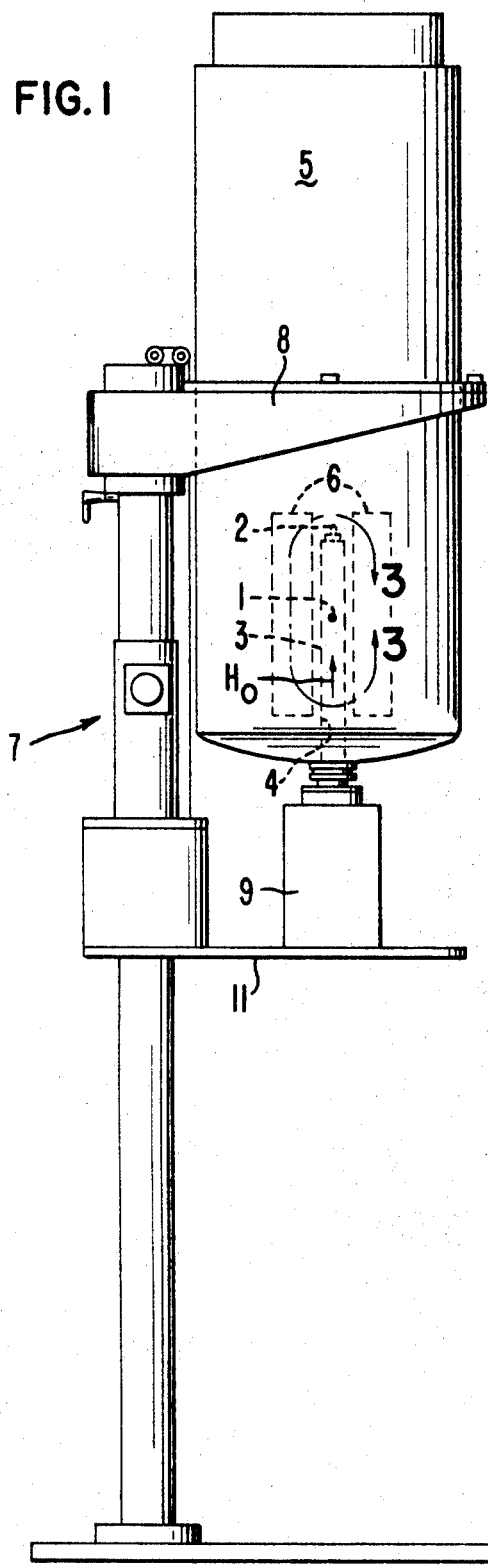
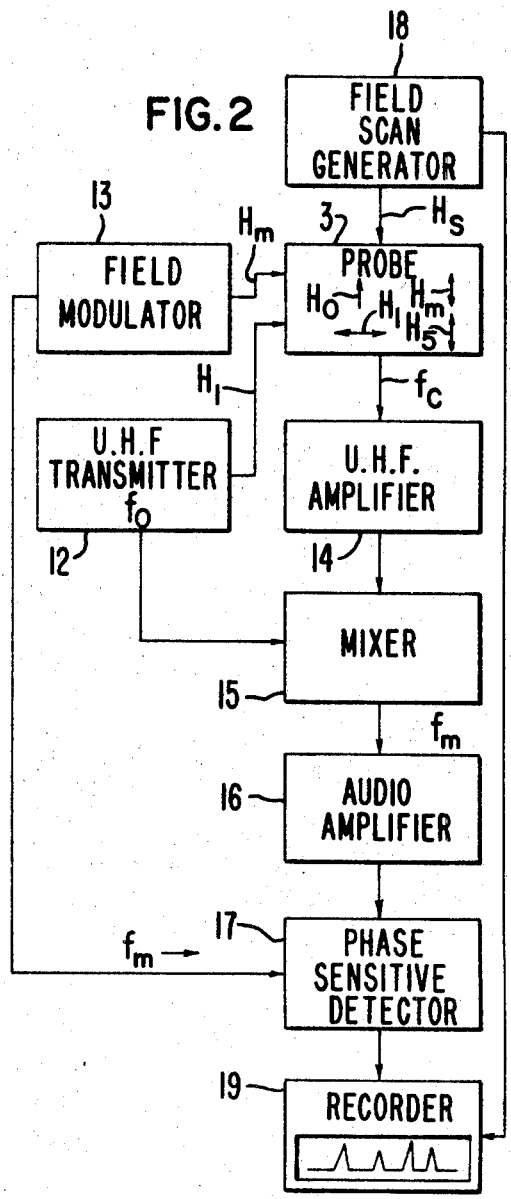
INVENTOR.
GEORGE A. BAKER
BY
ATTORNEY

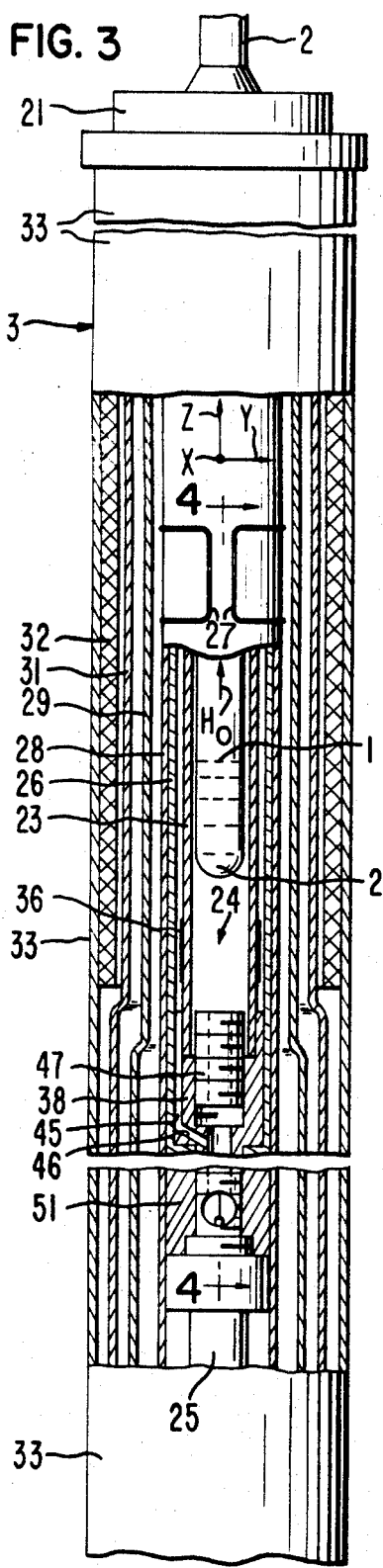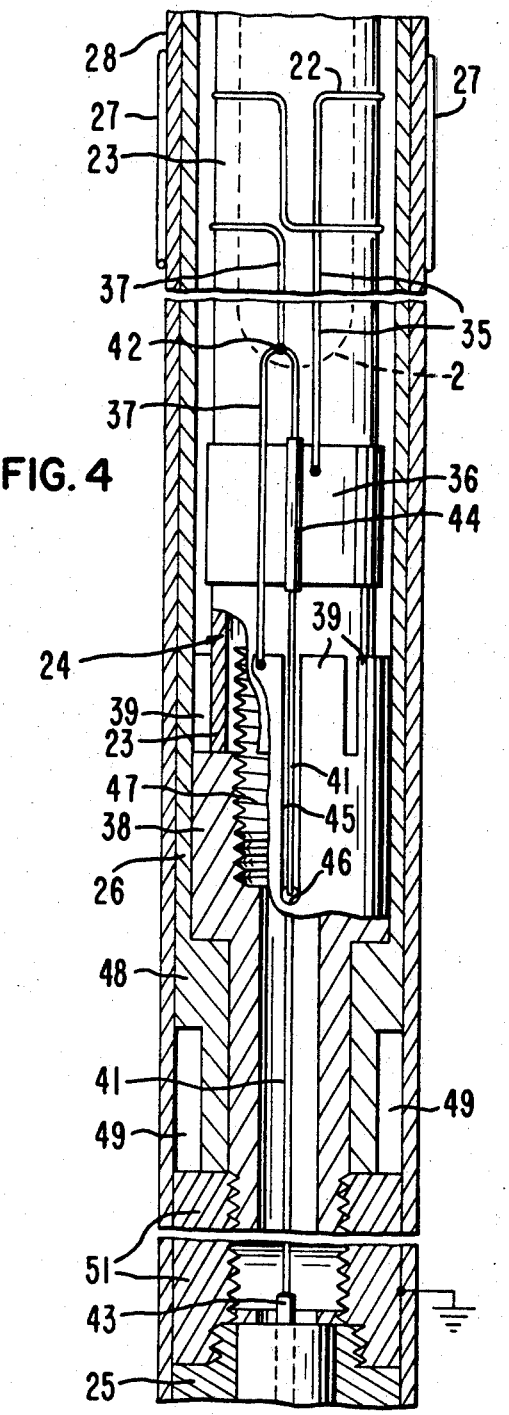

United States Patent Office 3,402,346
Patented Sept. 17, 1968

3,402,346
COAXIAL RECEIVER COIL AND CAPACITOR STRUCTURE FOR PROBES OF UHF GYROMAGNETIC SPECTROMETERS
George A. Baker, San Carlos, Calif., assignor to Varian Associates, Palo Alto, Calif., a corporation of California
Filed Apr. 22, 1966, Ser. No. 544,587
10 Claims. (Cl. 324—.5)

The present invention relates in general to an improved probe structure for ultrahigh frequency gyromagnetic resonance spectrometers and, more particularly, to an improved probe structure wherein the receiver coil and its tuning capacitor are coaxially disposed in the probe, whereby the stray inductance and radial space required for the tuning capacitor are reduced to provide enhanced signal to noise ratio for the spectrometer. Such an improved resonance probe, having the receiver coil coaxially disposed of its tuning capacitor, is especially useful in ultrahigh frequency gyromagnetic resonance spectrometers employing a superconductive solenoid for producing the unidirectional polarizing magnetic field.

Heretofore, ultrahigh frequency superconducting gyromagnetic resonance spectrometers have been built. In these systems the resonance receiver coil was tuned by a variable ceramic capacitor connected to the receiver coil via a pair of relatively long leads passing along the length of and out the end of the elongated cylindrical probe. The ceramic capacitor was located outside of the probe at one end of the elongated cylindrical probe and therefore was disposed a substantial distance away from the receiver coil. The long leads from the receiver coil to the capacitor were arranged parallel and closely spaced to reduce stray inductance. However, at their ends, where they connected to opposite terminals of the capacitor, a substantial circuit loop was produced. This loop together with the self inductance of the long leads introduced a substantial stray inductance into the tuned parallel resonant receiver coil circuit. This added (stray) inductance reduced the filling factor of the receiver coil and furthermore introduced additional resistive losses. As a result, the signal to noise ratio of the spectrometer was less than optimum.

In the present invention, the tuning capacitor for the resonance receiver coil is coaxially disposed of the receiver coil inside a tubular probe structure. The probe is centrally and concentrically disposed of the superconductive solenoid. By making the tuning capacitor coaxial with the receiver coil and disposing the capacitor inside the probe the capacitor is more closely spaced to the receiver coil to reduce lead length with its attendant resistive loss and stray inductance. As a result, the signal to noise ratio of the spectrometer is improved by a factor of two over the prior spectrometer design.

The principal object of the present invention is the provision of an improved ultrahigh frequency gyromagnetic resonance spectrometer.

One feature of the present invention is the provision of a coaxial receiver coil and tuning capacitor structure whereby the tuning capacitor may be more closely spaced to the tuned receiver coil to provide an enhanced signal to noise ratio for the detected gyromagnetic resonance.

Another feature of the present invention is the same as the preceding feature wherein the receiver coil is wound on a tubular support which also supports a capacitive element of the tuning capacitor formed on the coil form as an integral part thereof.

Another feature of the present invention is the same as the next preceding feature wherein the tuning capacitor includes a second capacitive element radially spaced and coaxially disposed of the first with its mutually opposed face shaped to conform to the opposed face of the first capacitive element.

Another feature of the present invention is the same as the next preceding feature wherein the second capacitive element is translatable relative to the first for tuning of the receiver coil.

Another feature of the present invention is the same as the next preceding feature including the provision of tapping an output from the tuned receiver coil at a point intermediate the length of one of the conductive leads which connects the tuning capacitor across the receiver coil.

Another feature of the present invention is the same as the next preceding wherein the output is taken from the receiver coil through a quarter wavelength impedance matching length of transmission line to another transmission line leading to the UHF amplifier of the receiver.

Figure 6:
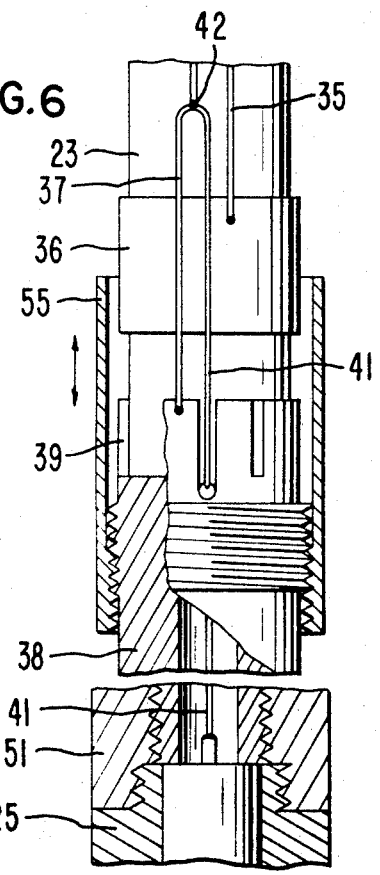
Figure 7:
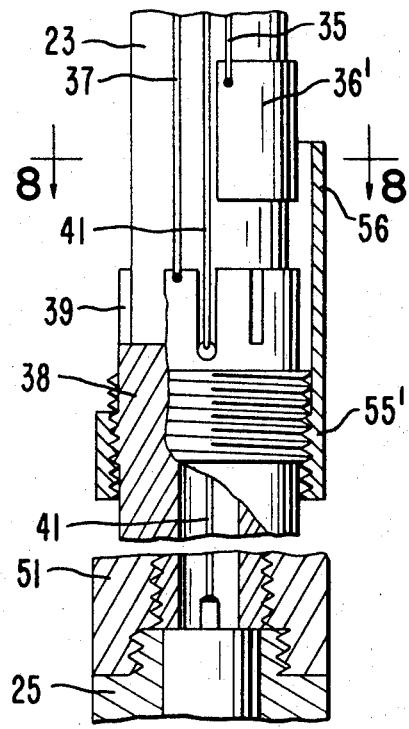
Figure 8:
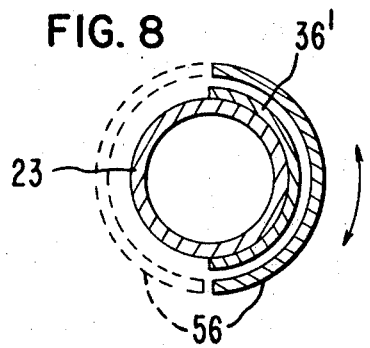

Other features and advantages of the present invention will become apparent upon a perusal of the following specification taken in connection with the accompanying drawings wherein:

FIG. 1 is a side elevational view of a gyromagnetic resonance spectrometer employing features of the present invention, FIG. 2 is a schematic block diagram of the spectrometer of FIG. 1, FIG. 3 is an enlarged sectional view of a portion of the structure of FIG. 1 delineated by line 3—3, FIG. 4 is an enlarged view, partly in section, of a portion of the structure of FIG. 3 delineated by line 4—4, FIG. 5 is a schematic circuit diagram of the receiver coil and transmission line of FIG. 4, FIGS. 6 and 7 are elevational views, partly in section, of alternative embodiments of a portion of the structure of FIG. 4 delineated by line 6—6, and FIG. 8 is a transverse sectional view of the structure of FIG. 7 taken along line 8—8 in the direction of the arrows.

Referring now to FIG. 1 there is shown a gyromagnetic resonance spectrometer employing the features of the present invention. More specifically, a gyromagnetic resonance sample 1 to be analyzed is inserted within a sample container 2 such as a glass vial disposed within an elongated probe structure 3. The probe 3, together with its sample to be analyzed, is inserted within a hollow interior cylindrical cavity 4 of a liquid helium Dewar 5. The Dewar 5 contains a superconductive solenoid 6 coaxially disposed of the probe 3. The solenoid 6 is cooled by the liquid helium within the Dewar 5 to superconductive temperatures as of 4° K. The solenoid 6 is energized with current to produce an intense axially directed uniform D.C. or unidirectional magnetic field $H_0$ as of 60 kg. within the probe 3 for polarizing the gyromagnetic bodies within the sample under analysis.

A stand 7 has the Dewar 5 hung from an arm 8 thereof. The probe 3 together with some of its associated equipment, contained within a base housing member 9, is supported from a movable arm 11. The movable arm permits the probe 3 to be axially inserted and withdrawn from the Dewar 5 through a central opening in the bottom end of the Dewar 5. The stand 7 forms the subject matter of and is claimed in copending U.S. application Ser. No. 544,775 filed Apr. 25, 1966, and assigned to the same assignee as the present invention.

Referring now to FIG. 2 the electrical circuitry of the spectrometer is shown. In a 52 kg. polarizing magnetic field $H_0$ the gyromagnetic resonance frequency $f_c$ of protons is about 220 mHz. Therefore, an ultrahigh frequency (UHF) transmitter 12 provides a crystal controlled output at 220 mHz. The output is fed to the probe 3 to produce an alternating magnetic field $H_1$ at right angles to the polarizing magnetic field $H_0$. In addition, the magnetic polarizing field $H_0$, over the sample volume, is modulated at a convenient audio frequency as of 10 kHz. by a field modulator 13. The transmitter frequency $f_0$ is displaced in frequency, by the field modulation frequency $f_m$ from the resonance frequency $f_c$ of the sample 1. Under these conditions a frequency modulated resonance spectrum of the sample is obtained, i.e., the resonance line of the sample contains a carrier resonance component at $f_c$ and sideband components, with Bessel function amplitudes, separated in frequency by the field modulation frequency $f_m$.

The F.M. resonance signal emanating from the sample is picked up by a tuned receiver coil, more fully described below and fed to a UHF amplifier 14 and thence to a mixer 15. In the mixer, the resonance spectrum is mixed with a sample of the transmitter frequency to produce a resonance signal, comprised of the F.M. carrier resonance component and one of its second sideband components, at the field modulation frequency $f_m$. This signal is amplified in audio amplifier 16 and fed to an audio frequency phase sensitive detector 17 wherein it is phase detected against a sample of the field modulation frequency $f_m$ derived from the field modulator 13 to produce a D.C. resonance output signal. The polarizing magnetic field $H_0$ over the sample 1 is scanned in intensity by a superimposed field scan component $H_s$ derived from a field scan generator 18. The D.C. resonance signal is recorded in recorder 19 as a function of time or magnetic field scan to obtain a recorded spectrum of the sample under analysis.

Referring now to FIG. 3 there is shown a longitudinal sectional view, partly in elevation, of the sample region of the probe 3 delineated by line 3—3. The probe 3 is approximately 20″ long from the housing 9 to its upper end and is about 1.1″ in outside diameter. The probe 3 contains several concentrically nested thin walled cylindrical members for performing several different functions and including cables for supplying operating alternating and D.C. potentials and for extracting the resonance signal from the sample.

More specifically, the probe 3 includes the centrally disposed cylindrical glass sample vial 2 containing the sample 1. The vial 2 is supported at its upper end in an air driven spinner assembly 21 which spins the vial 2 and sample 1 about its longitudinal axis at 3000 r.p.m. for averaging out line broadening effects produced in the sample by transverse field gradients in the polarizing field $H_0$. A receiver coil 22 (see FIG. 4), more fully described below, is wound on the outside surface of a glass tube 23 as of 0.250 outside diameter, O.D., and 0.015″ wall thickness. The coil 22 is tuned by a coaxially disposed capacitor 24. A coaxial line 25 extracts resonance signals from the tune receiver coil 22. A dielectric tube 26 as of 0.410″ O.D., spaced 0.040″ from the tube 23, is coated with closely spaced longitudinally directed conductive strips to serve as a Faraday shield between the receiver coil 22 and a transmitter coil 27 wound on the outside of a surrounding dielectric tube 28, as of 0.490″ O.D. The receiver coil 22 and transmitter coil 27 are wound with their coil axes at right angles to each other, i.e. along the X and Y axes, and both axes at right angles to the Z axis. The Z axis is parallel to $H_0$.

A tubular Dewar wall 29, having an inside diameter of 0.522, is spaced from the transmitter coil 27 and its form 28 to provide a passageway for heating or cooling gas. The heating or cooling gas passes up to a manifold, not shown, located just below the spinner 21 and comes back down the probe 3 in the space between the sample vial 2 and receiver coil from 23 for keeping the sample 1 at a desired operating temperature. A second tubular Dewar wall 31 as of 0.820″ O.D. is outwardly spaced from the first wall 29 with the space therebetween evacuated to provide thermal insulation for the inside of the probe Dewar relative to the cold interior surfaces of the liquid helium Dewar 5.

A cylindrical assembly 32 of separately adjustable magnetic field gradient cancelling coils, as of 0.845″ I.D. and 1.020″ O.D., surrounds the outer Dewar wall 31 of the probe. The outside wall 33 of the probe 3 is formed of aluminum tubing having an O.D. of 1.10″ to good thermal conduction from the cylindrical coil assembly 32 to the ambient for cooling of the coil assembly 32 in use.

Referring now to FIG. 4 there is shown, in more detail, the coaxially disposed receiver coil 22 and tuning capacitor 24 of the present invention. The receiver coil 22 is formed of a single wire strand wound on the glass tube 23 to form two current loops connected in magnetic aiding relation. One lead 35 to the coil 22 is about 1″ in length and is soldered at its end to a cylindrical band of silver metal 36 as of 5/16″ wide and 0.002″ thick which is metallized to the outside of the Pyrex tube 23 as by firing silver paste at 600° C. The wire coil 22 is held to the tube 23 by periodic spots of epoxy cement. Another wire lead 37 as of 1.250″ in length connects the other end of the receiver coil 22 to the end of a metallic sleeve 38 as of silver plated brass. The sleeve 38 is grounded for radio frequency energy and is axially segmented at its upper end to provide fingers 39 which grip the lower end of the glass tube 23.

A third lead 41 is tapped into lead 37 intermediate its length at 42 and connects the tap 42 to the center conductor 43 of the coaxial line 25. The lead 41 passes axially along the outside of the tube 23 across the silver band 36, where it is provided with a Teflon insulative sleeve 44, thence through a longitudinal slot 45 in the sleeve 38. At the terminal end of the slot 45, the lead 41 passes radially through a hole 46 in the sleeve 38 and thence coaxially thereof to the center conductor 43 of the output coaxial line 25. From the tap 42 to the hole 46 the lead 41 has a length of about 1.5″ and a length of about 1.25″ from the hole 46 to the center conductor 43 of the coaxial line 25.

An externally threaded cylindrical conductive plug 47 as of brass is screwed into the threaded interior of the grounded sleeve 38, thereby grounding the plug 47. The plug 47 serves as one capacitive element of the tuning capacitor 24, the band 36 forming the other capacitive element. The plug 47 is axially translatable of the metallic band 36 for changing the capacitance between the pair of capacitive members by changing their mutually opposed surface area. A tool, not shown, can be passed down the center of the probe to engage a recess in the end of the plug 47 for tuning by screwing the plug 47 in or out of the sleeve 38.

The Faraday shield tube 26 surrounds the tuned receiver coil 22 and is provided with a recessed collar portion 48 at its lower end which is engaged by the fingers 49 of a metallic sleeve 51 as of brass. The sleeve 51 threads over the external threads on the end of the first sleeve 38 and serves to capture the collar portion 48 of the shield tube 26 between the two sleeves 38 and 51. The output coaxial line 25 threads into the internal threads on the end of the second sleeve 51. The outer conductor of the coaxial line 25 is grounded for UHF and so are the sleeves 38 and 51.

Referring now to FIG. 5 there is shown the equivalent electrical circuit for the structure of FIG. 4. The receiver coil 22 is connected across the tuning capacitor 24 via leads 35 and 37 which include certain lead inductances which are not negligible at UHF frequencies, i.e., above 100 mHz. The tuning capacitor 24 tunes the receiver coil and its lead inductance for resonance at the Larmor frequency of the gyromagnetic bodies, such as for example, 220 mHz. As can be readily appreciated, the lead inductance should be minimized since it does not couple to the sample and therefore does not contribute to reception of the resonance signal but, nevertheless, introduces resistive loss into the tuned circuit, thus contributing to noise.

The output lead 41 is tapped into the lead 37 and forms the center conductor of an extension of the coaxial line 25 where it enters the slot 45 and a two wire line from the slot 45 to the tap 42. The composite length of the coaxial line 25 with its extension section and two wire section is made approximately one quarter wavelength long and with a constant characteristic impedance $Z_2=\sqrt{Z_3Z_1}$, where $Z_3$ is the characteristic impedance of the coaxial line, not shown, connecting coaxial line 25 to the UHF amplifier 14 and $Z_1$ is the impedance looking into the tuned coil 22 from the end of the composite coaxial line 25 at tap 42. It was found that the use of the coaxially disposed capacitor 24 for tuning the receiver coil improved the signal to noise ratio of the received resonance signal by a factor of two. Also the lead dress and coaxial line impedance matching appreciably improved the signal to noise ratio, as by another factor of two as compared to the prior arrangement of tuning the received coil by a capacitor across long leads extending the length of the probe 3.

Referring now to FIG. 6 there is shown an alternative embodiment of the coaxial capacitor structure shown in FIG. 4. In this alternative embodiment the structure is essentially the same except that the movable capacitive member is a metallic cylinder 55 surrounding the tube 23 and threadably mating with external threads provided on the sleeve 38. Rotation of the cylinder 55 causes it to travel axially of the tube 23 and change the mutually opposed area of the capacitor 24 for tuning of the receiver coil 22.

Referring now to FIGS. 7 and 8 there is shown still another alternative embodiment of the coaxially disposed tuning capacitor structure of FIG. 6. In this embodiment the band of silver 36' only extends half way around the tube 23. Likewise, the internally threaded cylinder 55' includes a semicyclindrical portion 56 forming the movable capacitive member. Rotation of the partially removed cylinder 55' through 180° to the position as shown in dotted lines of FIG. 8 produces minimum capacitance for the capacitor 24. Intermediate values of capacitance are obtained by rotation to provide intermediate values of mutually opposed area of the capacitive members.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Gyromagnetic resonance probe apparatus for use in conjunction with a magnet producing a central region of intense uniform unidirectional magnetic field including, means forming an elongated probe structure for immersing a gyromagnetic resonance sample of matter to be investigated in the hollow interior region of the magnet, said probe means including a plurality of concentrically nested coaxially disposed tubular members, means forming a receiver coil wound to curve with and conform to the surface of one of said nested tubular members for detecting resonance of the sample, means forming a tuning capacitor connected to said receiver coil means for tuning said receiver coil means to an ultrahigh frequency corresponding to the ultrahigh gyromagnetic resonance frequency of the sample in the polarizing magnetic field, said tuning capacitor being contained within said nested tubular members of said probe means and being coaxially disposed of said receiver coil means, whereby said tuning capacitor and said receiver coil means form a compact coaxial structure to minimize stray lead inductance and provide enhanced signal to noise ratio for the detected resonance signal.

2. The apparatus of claim 1 wherein said tuning capacitor means includes a pair of arcuate conductive capacitive member portions which member portions are coaxially disposed of said receiver coil tubular support member.

3. The apparatus of claim 2 wherein one of said conductive capacitive member portions is affixed on and curves with the surface of said tubular receiver coil support member.

4. The apparatus of claim 2 wherein one of said capacitive member portions is movable relative to the other for tuning of the receiver coil means.

5. The apparatus of claim 3 wherein said capacitive member portion which is affixed on said tubular receiver coil support is a band of metal.

6. The apparatus of claim 5 including, a conductive lead connecting said fixed band of metal to one terminal of said receiver coil means, a second conductive lead connecting another terminal of said receiver coil means to said other capacitive member portion of said pair of member portions, and a third conductive lead connected intermediate the length of one of said leads for connecting said receiver coil means to an amplifier.

7. The apparatus of claim 6 wherein said third conductive lead includes a quarter wavelength section of transmission line for impedance matching a section of coaxial line to the impedance of said tuned receiver coil means.

8. The apparatus of claim 5 wherein said other capacitive member portion which is opposed to said band of metal is connected directly to and operated at ultrahigh frequency ground potential.

9. The apparatus of claim 4 wherein said movable capacitive member portion is connected directly to and operated at ultrahigh frequency ground potential.

10. The apparatus of claim 1 including in combination means for applying ultrahigh frequency energy to the sample for exciting resonance, a superconductive solenoid for producing the polarizing magnetic field, and means for amplifying the resonance signals picked up by said receiver coil to produce an output spectrum.

References Cited

UNITED STATES PATENTS

| 2,618,749 | 11/1952 | Altenberger | 334—81 |
| 2,780,784 | 2/1957 | Hill | 334—81 |
| 2,980,797 | 4/1961 | Million | 334—81 |
| 3,081,428 | 3/1963 | Fowler | 324—5 |
| 3,287,630 | 11/1966 | Gang | 324—5 |

RUDOLPH V. ROLINEC, *Primary Examiner.*

M. J. LYNCH, *Assistant Examiner.*